United States Patent [19]

Laitinen et al.

[11] Patent Number: 4,552,641

[45] Date of Patent: Nov. 12, 1985

[54] PROCESS FOR PREPARING A PLATINUM SURFACE ON TIN OXIDE SUBSTRATE

[76] Inventors: Herbert A. Laitinen, 337 Leigh Hall, Gainesville, Fla. 32611; James R. Waggoner, 4085 Nobel Dr., #13, San Diego, Calif. 92122

[21] Appl. No.: 566,478

[22] Filed: Dec. 28, 1983

[51] Int. Cl.$^4$ ............................ C25D 3/50; C25D 5/34
[52] U.S. Cl. .................................... 204/32.1; 204/29; 204/47
[58] Field of Search ........................ 204/29, 32.1, 47

[56] References Cited

U.S. PATENT DOCUMENTS

| | | | |
|---|---|---|---|
| 3,276,976 | 10/1966 | Juliard | 204/43 |
| 3,340,097 | 9/1967 | Hess et al. | 136/120 |
| 4,273,624 | 6/1981 | Laitinen et al. | 204/23 |

OTHER PUBLICATIONS

F. A. Lowenheim, Electroplating, McGraw-Hill Book Co., New York, 1978, pp. 298–300.
M. Watanabe, Preparation of Dispersed Platinum on Conductive Tin Oxide . . . , *Journal of the Electrochemical Society,* vol. 130, No. 1, Jan. 1963, pp. 59–64.

*Primary Examiner*—Andrew H. Metz
*Assistant Examiner*—William T. Leader
*Attorney, Agent, or Firm*—Arthur G. Yeager

[57] ABSTRACT

A process for coating tin oxide with platinum which comprises soaking a tin oxide substrate in a strong caustic solution to activate the substrate, washing the substrate to remove all caustic solution, immersing the washed substrate in an alkaline solution containing $Pt(OH)_6^=$ ions applying an electric potential of +0.1 to +0.7 volt to the immersed substrate, and recovering the substrate having a coating of platinum. This process is useful in preparing active platinum-coated catalysts using very small amounts of platinum.

10 Claims, No Drawings

PROCESS FOR PREPARING A PLATINUM SURFACE ON TIN OXIDE SUBSTRATE

The Government has rights in this invention pursuant to Contract Number NSF 83-43-CHE-82-00341.

BACKGROUND OF THE INVENTION

The preparation of platinum coatings on various substrates for use as catalysts have been the subject of many patents. A particularly important combination is platinum coated on tin oxide which is optically transparent.

In the prior art there is described in U.S. Pat. No. 4,273,624 a process for coating tin oxide with platinum by immersive tin oxide as an electrode in an electrolyte containing platinum ions and applying a potential which varies with time from positive to negative to positive. Another method of preparing a coating of platinum on tin oxide is described in an article entitled "Preparation of Dispersed Platinum On Conductive Tin Oxide And Its Catalytic Activity For Oxygen Reduction" by Watanabe et al. J. Electrochemical Society, Vol. 130, pages 59-64, January, 1983. In this method a tin oxide substrate is treated with a strong caustic solution to activate the substrate, immersed in a buffered solution of a platinum complex for a time sufficient for some of the platinum complex to bind to the substrate, and heating the substrate and bound platinum complex to a temperature of about 200°-300° C.

It has been found that the platinum coating prepared by the Watanabe et al. process is an agglomeration of platinum crystallites not approaching the ideal of a layer of platinum atoms. While the Watanabe et al. process is better than that previously known because it employs less platinum, there is much room for improvement to approach the ideal of an atomic layer.

An object of this invention is to provide an improved process for depositing a thin layer of platinum of a tin oxide substrate. It is another object of this invention to provide an improved process for depositing platinum on a tin oxide substrate by using a controlled potential chemisorption. Still other objects will appear from the more detailed description which follows.

BRIEF DESCRIPTION OF THE INVENTION

This invention relates to a process for depositing platinum on a tin oxide substrate which comprises soaking a tin oxide substrate in a strong caustic solution at 70°-100° C. for 10-60 minutes, removing the substrate from the solution and washing substantially all of the caustic therefrom, immersing the caustic treated substrate in 0.001M to 0.1M alkaline solution of $Pt(OH)_6^=$, applying an electric potential of $+0.1$ to $+0.7$ volt to the immersed substrate, and recovering said substrate with a thin coating of platinum. The strong caustic solution may be a solution of metal hydroxide having a concentration of 5-15 molar. The potential may be applied for 0.5 to 10 hours while the alkaline solution is maintained at 70°-90° C.

In a preferred embodiment of this invention the tin oxide substrate is soaked in a 10M. NaOH solution for 15-60 minutes (more specifically, for 30 minutes at 90° C.), washed to remove all hydroxide, immersed in an electrolyte of $Na_2Pt(OH)_6$ dissolved in 0.001M to 0.01M KOH and subjected to an electric potential of $+0.1$ to $+0.7$ volt, and the tin oxide substrate is recovered having a very thin platinum coating. The applied potential may be in the range of $+0.1$ to $+0.5$ volt and the solution to which the potential is applied may be at about 80° C.

DETAILED DESCRIPTION OF THE INVENTION

The present invention concerns a new method, controlled-potential chemisorption, for the preparation of platinized tin oxide. The term "chemisorption" is used to describe a process involving a chemical reaction at a surface. In the prior art of catalyst literature it has sometimes been used to describe the preparation of a metallic catalyst by soaking a porous or granular support material with a solution containing a salt of the metal, and heating to effect a reaction between the surface and the solution. The amount of metal is determined by the amount in solution, because it is not rinsed away. Precious metal catalysts prepared in this way consist of crystallites produced by thermal decomposition of the compound in solution. In contrast, the present procedure consists of controlling the amount of platinum deposition by controlling the solution composition, the platinum salt concentration, the temperature, and in particular, applying a controlled potential to control the reaction rate. The platinum compound remaining unreacted in solution is removed, and can be re-used after replenishment of the platinum. The procedure is designed especially for the application of very small amounts of platinum (for example, 0.01 to 0.10 micrograms of platinum per $cm^2$ of true surface area), less than the equivalent of a compact monolayer, which would correspond to about 0.3 micrograms for a smooth surface. It has been found that these small amounts show catalytic activity.

In the Watanabe et al. article cited above, a process is described which involves chemisorption, but which does not differ greatly from other prior art procedures. The amount of platinum deposited is controlled by the solution composition, the platinum concentration, the temperature and time of reaction, but no control of electrical potential is involved, and the platinum deposited is not a fractional monolayer. It is believed that the platinum solutions used in this process were metastable with respect to precipitation of hydrous oxides or basic salts of platinum, with the surface constituting a nucleation site for precipitation. The platinum crystallites resulting from this process are very similar to those resulting from conventional methods, and the only real difference is that the amount of platinum is determined by the conditions of the step of immersing the tin oxide substrate in a platinum complex solution rather than the total amount of platinum in the solution.

In contrast, the present invention involves the use of a solution which is thermodynamically stable against precipitation, and from which no platinum is deposited onto the surface by simple dipping or soaking. It is necessary to apply an anodic (positive) potential and the rate of deposition depends strongly upon the applied potential. It is believed that the process involves the application of a potential gradient in the electric double layer at the solid-solution interface to overcome the electrostatic repulsion between a negatively charged surface and negatively charged ions in solution. But the reaction is not a simple electrostatic interaction because it is slow and irreversible. It is believed that it involves a condensation between hydroxy groups at the surface and hydroxy groups coordinated to platinum to form a covalent bond such as Sn-O-Pt at the surface. The first step in the present invention is fundamentally different also, in that it does not involve a thermal decomposition but an electrochemical reduction at ambient temperature. The reaction conditions for this step do not appear critical, but it is desirable to avoid appreciable hydrogen evolution, which might be destructive of the surface.

In this invention the platinum is in the form of hexahydroxyplatinate (IV) ion, $Pt(OH)_6^=$, in alkaline solution. This solution may be conveniently prepared by dissolving the commercially available sodium salt $Na_2Pt(OH)_6$ in KOH (which is preferred over NaOH because of greater solubility). The resulting solution is indefinitely stable against precipitation. Alternatively, the solution can be prepared from other complexes of platinum (IV), such as $H_2PtCl_6$, by allowing a reaction to proceed with excess KOH.

A series of experiments were undertaken to determine how the amount of deposited platinum is influenced by time and by the applied potential. The data were collected from the use of a three electrode system including a platinum counter electrode, the tin oxide electrode described above, and a saturated calomel reference electrode. The electrolyte was a solution of 0.01M KOH containing 500 micrograms per ml of Pt as $Pt(OH)_6^=$. The temperature of the electrolyte was maintained at 80° C. and the time and potential varied from 30 minutes at +0.1 volt to 10 hr. at +0.7 volt. The results indicated an optimum deposition at about +0.3 volt (measured with reference to the saturated calomel electrode). When no potential was applied there was a negligible amount of platinum deposited.

In Table I there are listed data concerning the catalytic activity of the fractional monolayer quantities of platinum deposited under the conditions of the present invention as described above with respect to the accompanying drawing. Hydrogen evolution was measured at an arbitrary small current density of about 50 microamperes per square centimeter in 1M. sulfuric acid, with the potential measured against the saturated calomel electrode.

TABLE I

| Reaction Conditions | Estimated Surface Coverage nanograms Pt/cm$^2$ | Potential For H$_2$ Evolution Volts |
|---|---|---|
| No platinization | none | −0.64 |
| 30 min at 80° C., +0.6 volt | Less than 3 | −0.247 |
| 10 hr at 80° C., +0.7 volt | 70 | −0.220 |
| bright platinum | | −0.210 |

It is clear that tin oxide has a higher overpotential for hydrogen evolution than bright platinum to the extent of about 0.43 volt (the difference between −0.64 and −0.21). The smallest amount of platinization, reported as less than 3 nanograms or 0.003 micrograms/cm$^2$, was below the detection limit of the electrochemical estimation method. Yet this surface showed an overpotential of only 0.037 (the difference between −0.247 and −0.210) as compared with bright platinum. Using the more drastic conditions of 10 hours at +0.7 volt, with 70 nanograms of Pt deposited, the overpotential compared with bright platinum was further decreased to 0.01 volt.

The maximum permissible applied potential varies with the concentration of hydroxide, because it is limited by the evolution of oxygen. It is advantageous to apply a potential just below oxygen evolution to maximize the reaction rate but to pass only a very small current, so that no special precautions need be taken to ensure uniform current distribution throughout a porous bed.

Another special feature of this invention is the method of activating the deposited platinum. Instead of using a thermal decomposition procedure, an electrochemical reduction is accomplished by applying a small cathodic current to the surface in an alkaline solution not containing platinum. This can be readily done by rinsing off the platinum-containing solution with a solution of KOH. For example, using 0.5M KOH, a cathodic potential of −1.2 volts with reference to the saturated calomel electrode will activate the platinum, presumably by reducing it to the metallic state.

In studies employing a new method of chemical analysis, electron spectroscopy also known as X-ray photoelectron spectroscopy, to determine the amount of platinum deposited on a substrate, it was confirmed that no appreciable amount of platinum is deposited by merely soaking the tin oxide surface in an alkaline solution of hexahydroxyplatinum (IV) ion, $Pt(OH)_6^=$. When the surface was connected to a source of potential, no appreciable deposition was observed at applied potentials more negative than +0.1 volt with respect to the saturated calomel electrode. The greatest rate of deposition was observed at +0.30 volt. At +0.50 volts, a lesser amount of platinum was found. At higher anodic polarizations, negligible amounts of deposit were formed. The reason for the decrease at excessive polarizations is not known. A possible explanation is that precursors to molecular oxygen may be present at the surface at excessively positive potentials, and that these species might interfere with the chemisorption reaction. In any case, in repeated experiments is has been found that there is an optimum potential, which may depend upon the solution composition, for example, the concentration of hydroxide. As mentioned above, hydroxide is essential to stabilize the platinum complex against hydrolysis, which could precipitate the platinum from solution. Preferred potentials are between +0.1 and +0.7 using 0.001M to 0.1M hydroxide.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. The process of depositing platinum on a tin oxide substrate which comprises soaking a tin oxide substrate in a strong caustic solution at 70°–100° C. for 10–60 minutes, removing said substrate from the solution and washing caustic therefrom, immersing said caustic treated substrate in a 0.001M to 0.1M alkaline solution of $Pt(OH)_6^=$, applying an electric potential of +0.1 to +0.7 volt to the immersed substrate, and recovering said substrate with a thin coating of platinum in an amount less than the equivalent of a compact monolayer.

2. The process of claim 1 wherein said caustic solution is 10M NaOH solution.

3. The process of claim 2 wherein the soaking treatment is for 30 minutes at 90° C.

4. The process of claim 1 wherein said potential is applied to the alkaline solution at 70°–90° for 0.5 to 10 hours.

5. The process of claim 1 wherein said $Pt(OH)_6^=$ is prepared by dissolving $Na_2Pt(OH)_6$ in KOH.

6. The process of preparing a platinum-coated tin oxide substrate which comprises:
   (a) soaking for 15-60 minutes a tin oxide substrate in a solution of metal hydroxide having a concentration of 5-15 molar,
   (b) removing the substrate from the solution and washing it to be substantially free of hydroxide,
   (c) immersing the washed substrate in a solution of $Na_2Pt(OH)_6$ in 0.001M to 0.1M KOH and applying to the substrate an electric potential of +0.1 to +0.7 volt; and
   (d) recovering the substrate coated with a thin layer of platinum in the amount of 0.01 to 0.10 micrograms of platinum per $cm^2$ of true surface area.

7. The process of claim 6 in which said potential is applied for 0.5 to 10 hours while the solution of $Na_2Pt(OH)_6$ and KOH is maintained at 70°-90° C.

8. The process of claim 6 in which said soaking is accomplished at a temperature of about 90° C. and a time of about 30 minutes.

9. The process of claim 6 in which said soaking solution is 10M NaOH.

10. The process of claim 6 in which said potential is in the range of +0.1 to +0.5 volt and the solution to which the potential is applied is at about 80° C.

* * * * *